US010020509B2

(12) United States Patent
Shin et al.

(10) Patent No.: US 10,020,509 B2
(45) Date of Patent: Jul. 10, 2018

(54) LITHIUM TRANSITION METAL PHOSPHATE, METHOD FOR PRODUCING SAME, AND LITHIUM SECONDARY BATTERY PRODUCED USING SAME

(71) Applicant: SAMSUNG SDI CO., LTD., Yongin-si, Gyeonggi-do (KR)

(72) Inventors: Jae Seung Shin, Hwaseong-si (KR); Jong Min Kim, Seoul (KR); Dong Gyu Chang, Daejeon (KR); Hyun A Song, Anyang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/109,417

(22) PCT Filed: Aug. 14, 2014

(86) PCT No.: PCT/KR2014/007571
§ 371 (c)(1),
(2) Date: Jun. 30, 2016

(87) PCT Pub. No.: WO2015/102200
PCT Pub. Date: Jul. 9, 2015

(65) Prior Publication Data
US 2016/0329565 A1  Nov. 10, 2016

(30) Foreign Application Priority Data
Dec. 30, 2013 (KR) .................. 10-2013-0167133

(51) Int. Cl.
*H01B 1/08* (2006.01)
*H01M 4/58* (2010.01)
(Continued)

(52) U.S. Cl.
CPC .......... *H01M 4/5825* (2013.01); *C01B 25/45* (2013.01); *H01B 1/08* (2013.01); *H01M 4/623* (2013.01);
(Continued)

(58) Field of Classification Search
CPC .. H01B 1/00; H01B 1/06; H01B 1/08; H01M 4/0471; H01M 4/48
See application file for complete search history.

(56) References Cited

U.S. PATENT DOCUMENTS 7,282,301 B2    10/2007  Wixom et al.
8,545,736 B2 *  10/2013  Jun .................. B82Y 30/00
                                            252/518.1
(Continued)

FOREIGN PATENT DOCUMENTS

CN        103094565 A      5/2013
KR    10-2007-0091273 A    9/2007
KR    10-2013-0073810 A    7/2013

OTHER PUBLICATIONS

Zhao et al "Hydrothermal synthesis and properties of manganese-doped LiFePO4", Ionics (2012) 18:873-879.*
(Continued)

*Primary Examiner* — Mark Kopec
(74) *Attorney, Agent, or Firm* — Lewis Roca Rothgerber Christie LLP

(57) ABSTRACT

The present invention relates to a lithium transition metal phosphate including nano rod-like $Fe_2P$ crystals, a method of preparing the same, and a lithium secondary battery manufactured by using the lithium transition metal phosphate. According to the present invention, a lithium transition metal phosphate including nano rod-like $Fe_2P$ crystals may be provided, thereby enhancing high rate capability and low-temperature properties of a lithium secondary battery prepared by using the same. Further, the whole or a part of
(Continued)

an airflow direction in a firing furnace may be controlled to be in a direction opposite to a proceeding direction of a fired raw material by adjusting the exhaust conditions in the firing process, thereby providing a method of preparing a lithium transition metal phosphate, in which the nano rod-like $Fe_2P$ crystals are reproducibly included.

11 Claims, 9 Drawing Sheets

(51) Int. Cl.
    *C01B 25/45*      (2006.01)
    *H01M 10/0525*      (2010.01)
    *H01M 4/62*      (2006.01)
    *H01M 4/66*      (2006.01)
    *H01M 4/02*      (2006.01)

(52) U.S. Cl.
    CPC ........... *H01M 4/625* (2013.01); *H01M 4/661* (2013.01); *H01M 10/0525* (2013.01); *C01P 2004/16* (2013.01); *C01P 2006/12* (2013.01); *C01P 2006/40* (2013.01); *H01M 2004/027* (2013.01); *H01M 2220/20* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 2011/0068298 A1 | 3/2011 | Wixom et al. |
| 2013/0164622 A1 | 6/2013 | Park et al. |
| 2013/0334457 A1 | 12/2013 | Park et al. |

OTHER PUBLICATIONS

Toprakei et al "Fabrication and electrochemical characteristics of LiFePO4 powders for lithium-ion batteries", 2010 Hosokawa Powder Technology Foundation KONA Powder and Particle Journal No. 28, pp. 50-73.*

Lee, Kyung Tae et al., "*Electrochemical properties of LiFe0.9Mn0.1PO4/Fe2P cathode material by mechanical alloying*", Journal of Power Sources, vol. 189 (2009) pp. 435-439.

Rho, Young-Ho et al., "*Surface Chemistry of LiFePO4 Studied by Mössbauer and X-Ray Photoelectron Spectroscopy and Its Effect on Electrochemical Properties*", Journal of the Electrochemical Society, vol. 154, No. 4, Feb. 9, 2007, pp. A283-A289.

Wu, She-huang, et al., "*Effects of Fe2P and Li3PO4 additives on the cycling performance of LiFePO4/C composite cathode materials*", Journal of Power Sources, vol. 196 (2011) pp. 6676-6681.

International Search Report for corresponding PCT Application No. PCT/KR2014/007571, dated Dec. 12, 2014, with English Translation (5 pages).

Written Opinion for corresponding PCT Application No. PCT/KR2014/007571, dated Dec. 12, 2014, with English Translation (11 pages).

Young-Ho Rho et al., "Surface Chemistry of $LiFePO_4$ Studied by Mössbauer and X-Ray Photoelectron Spectroscopy and Its Effect on Electrochemical Properties," Journal of the Electrochemical Society, 2007, vol. 154, Issue 4, pp. A283-A289.

SIPO Office Action, with English translation, dated Apr. 26, 2017, for corresponding Chinese Patent Application No. 201480074248.0 (24 pages).

TIPO Office Action, with English translation, dated Dec. 21, 2017, for corresponding Taiwanese Patent Application No. 103125472 (11 pages).

* cited by examiner

[Fig. 1]
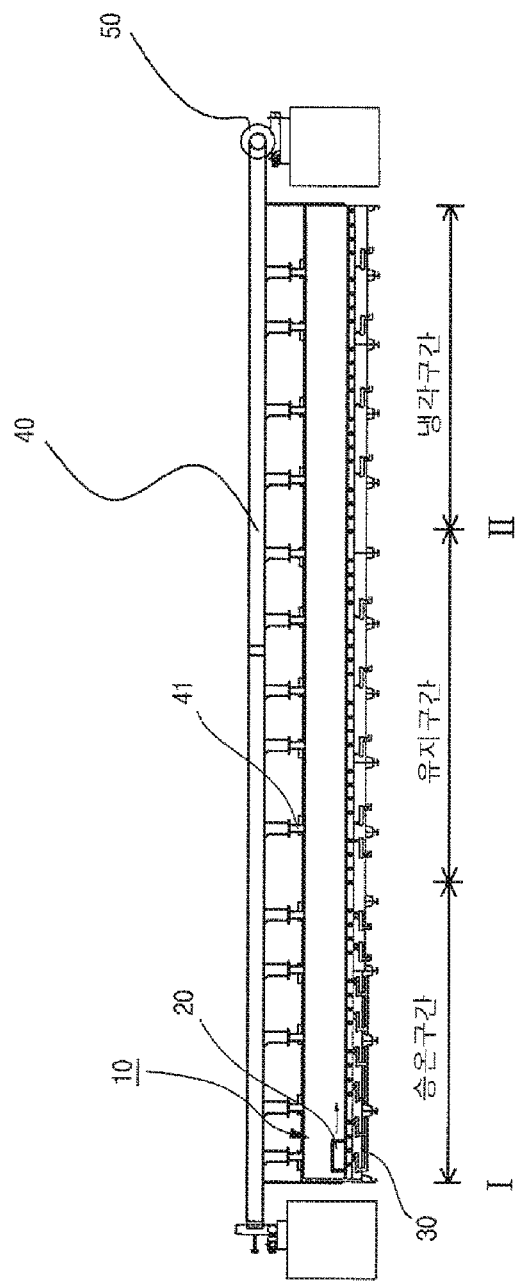

[Fig. 2]
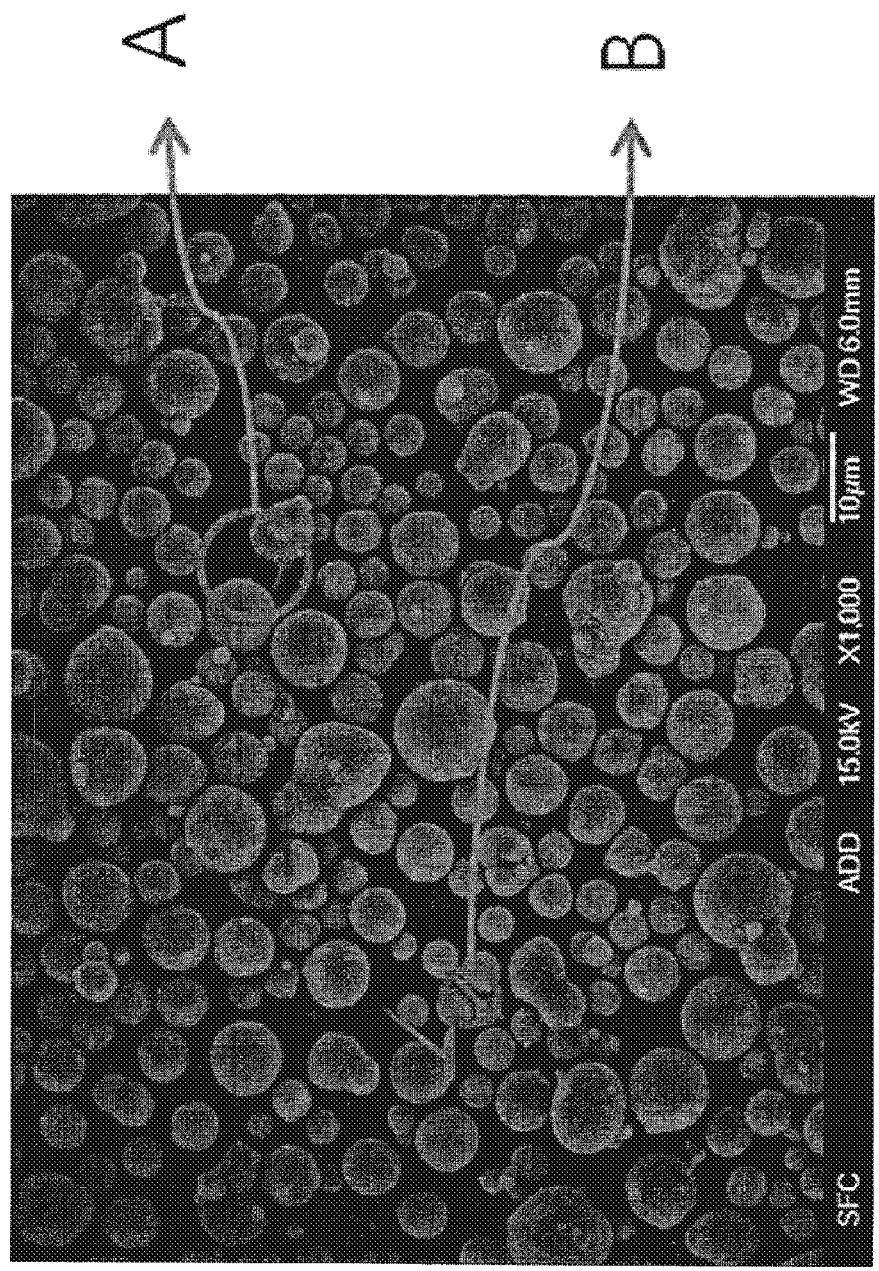

[Fig. 3]
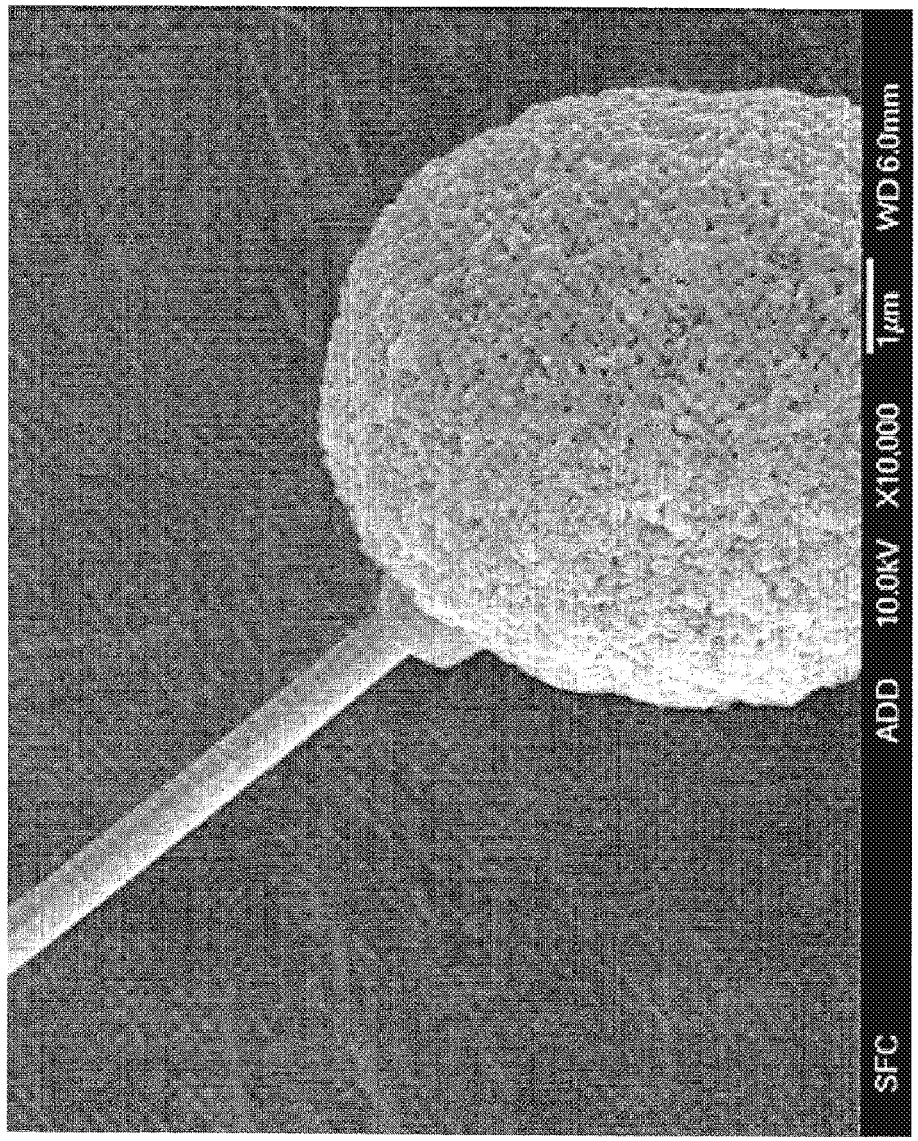

[Fig. 4]
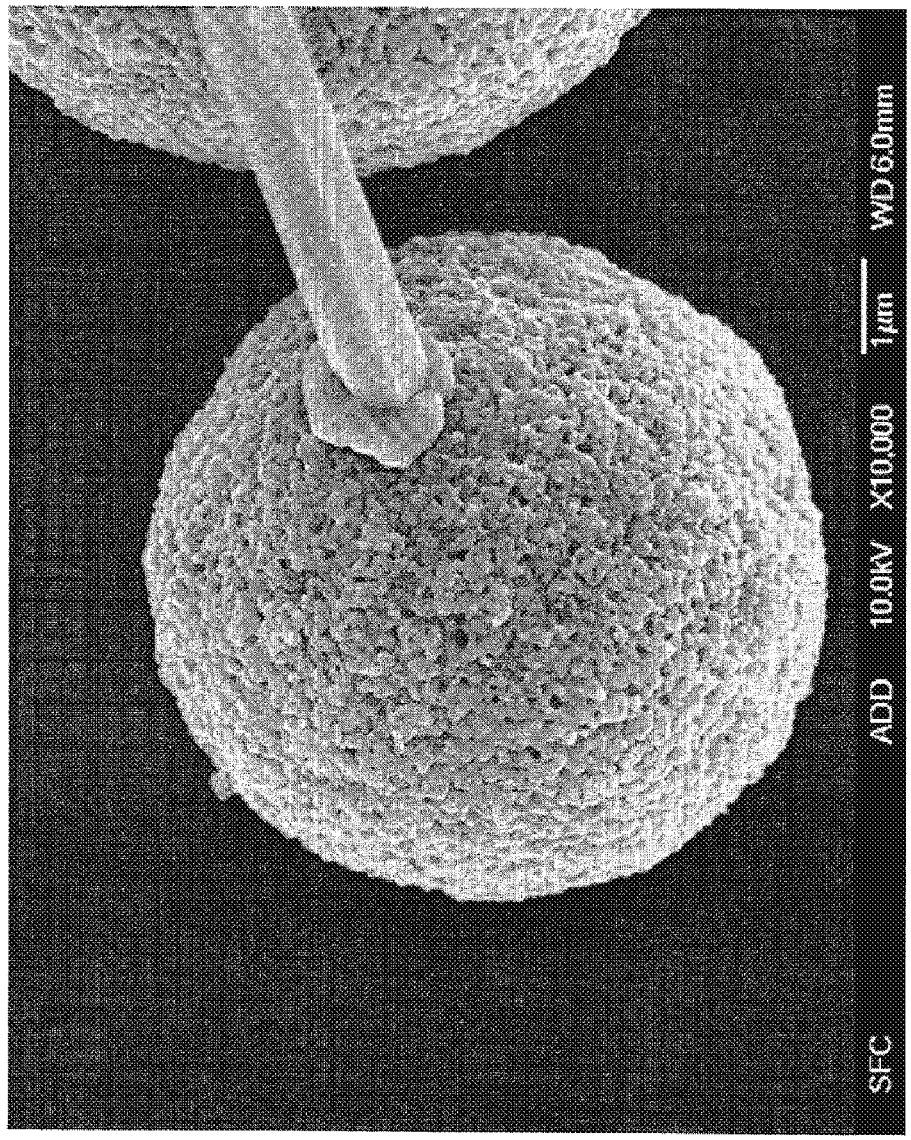

[Fig. 5]
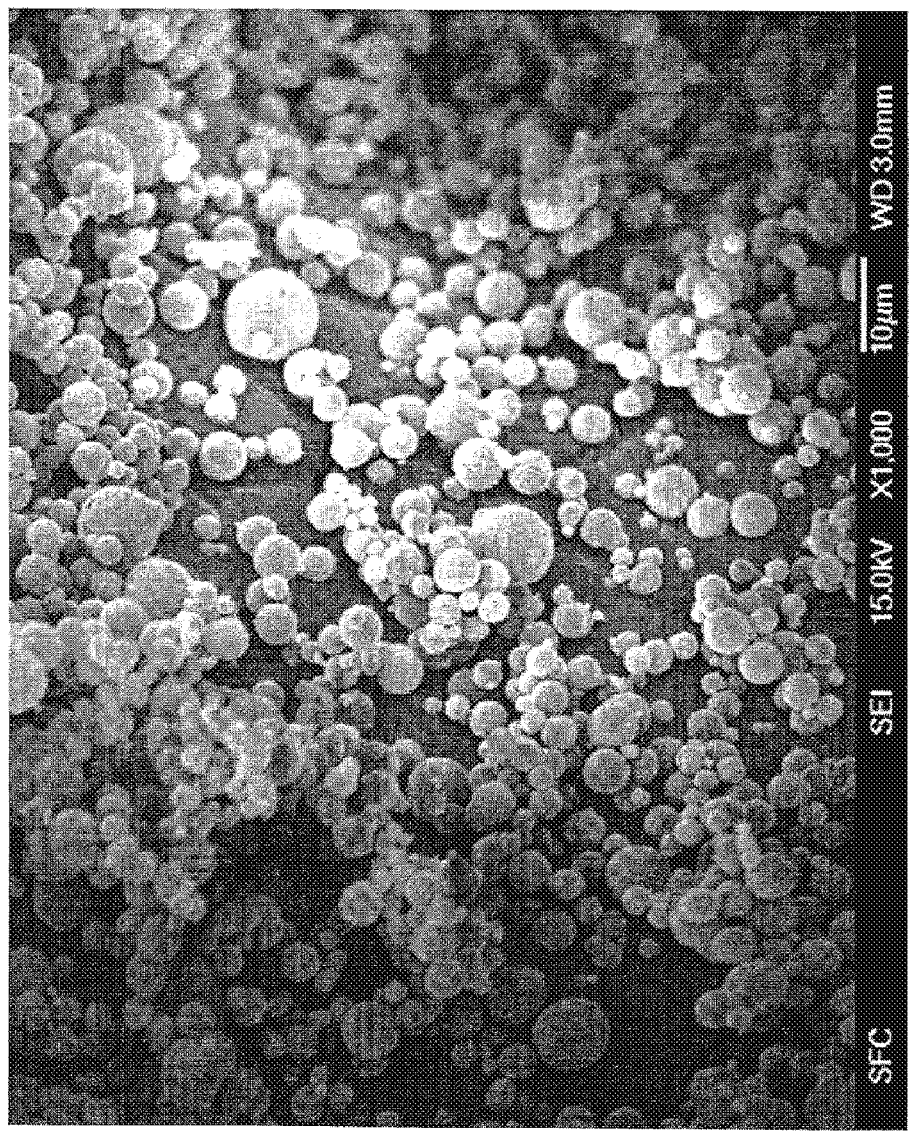

[Fig. 6]
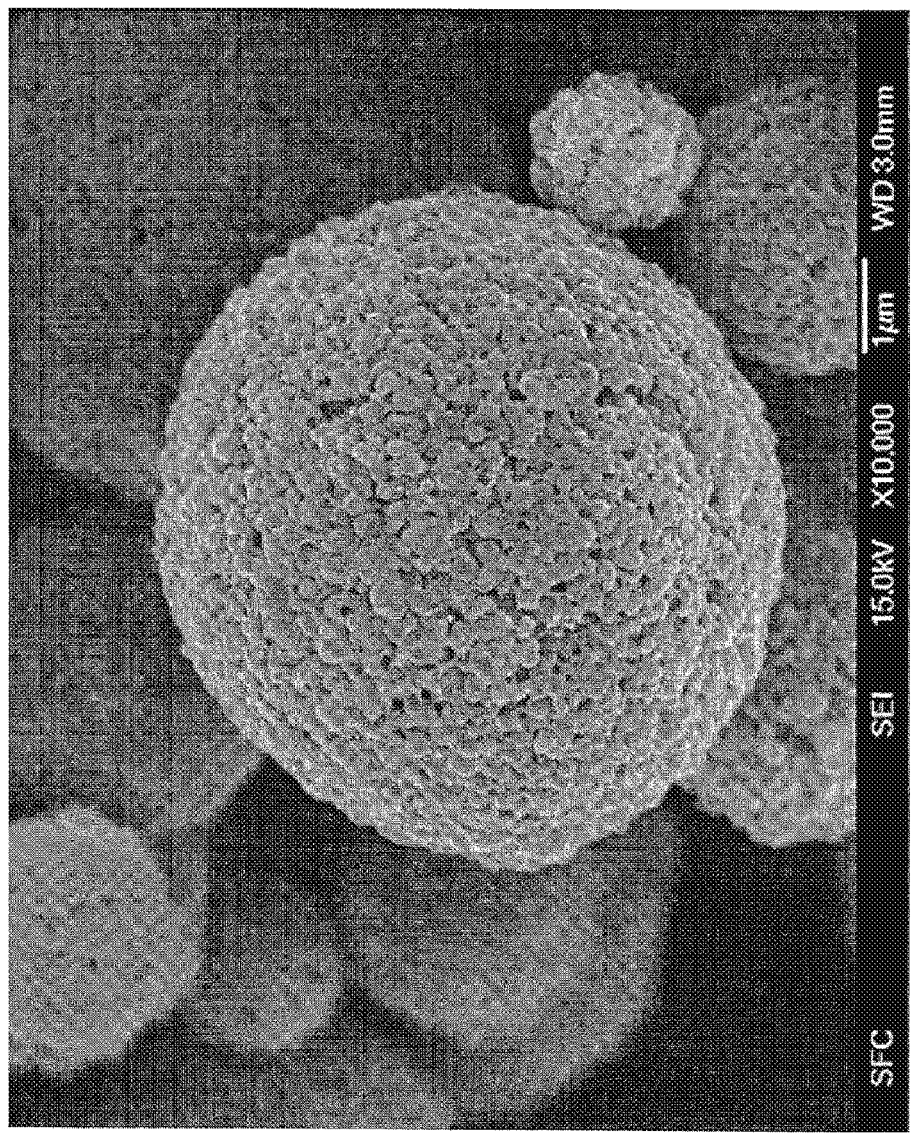

[Fig. 7]
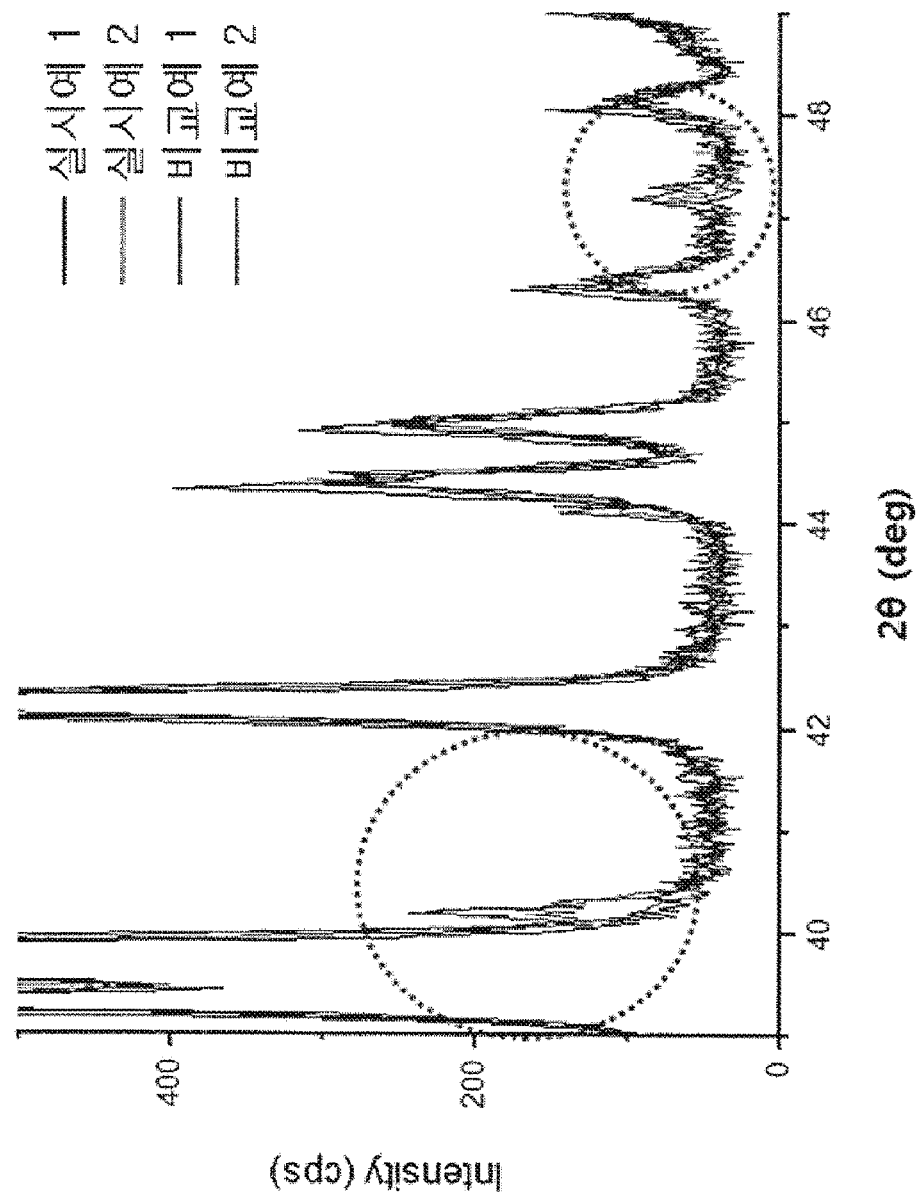

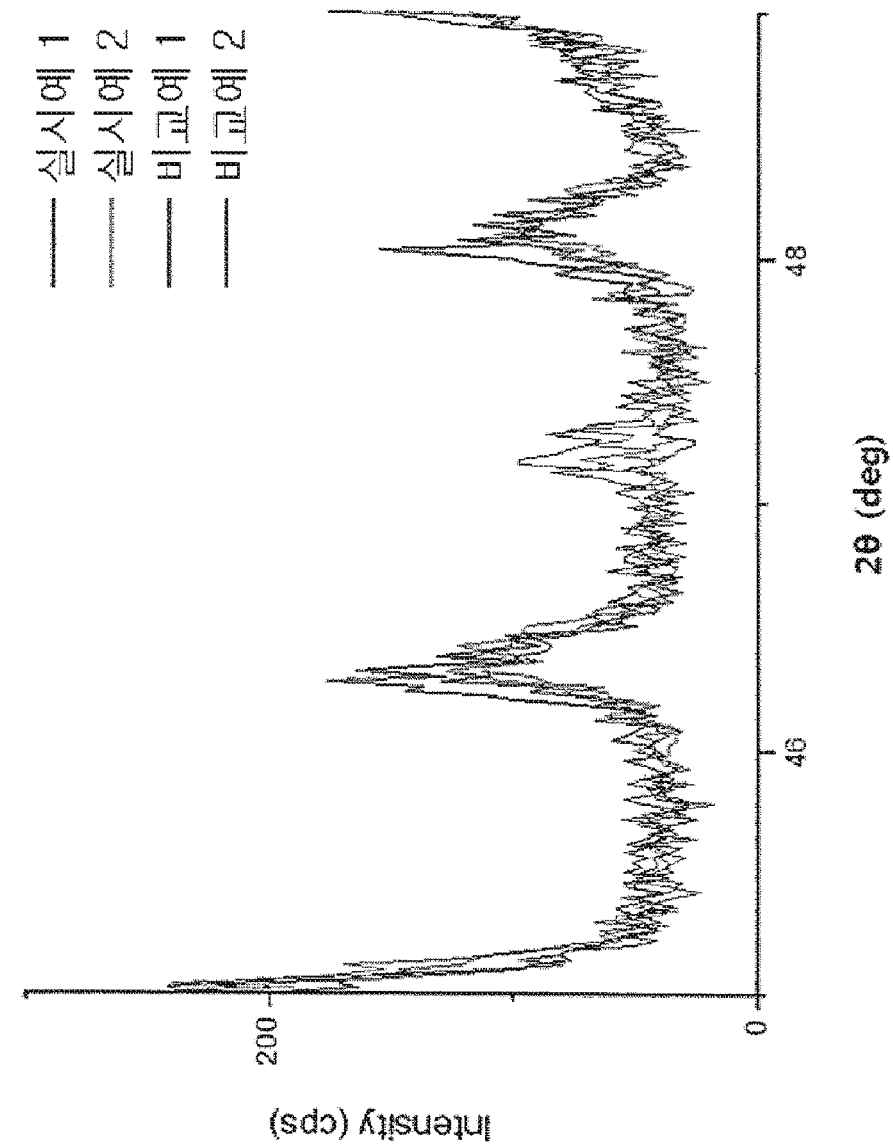
[Fig. 8]

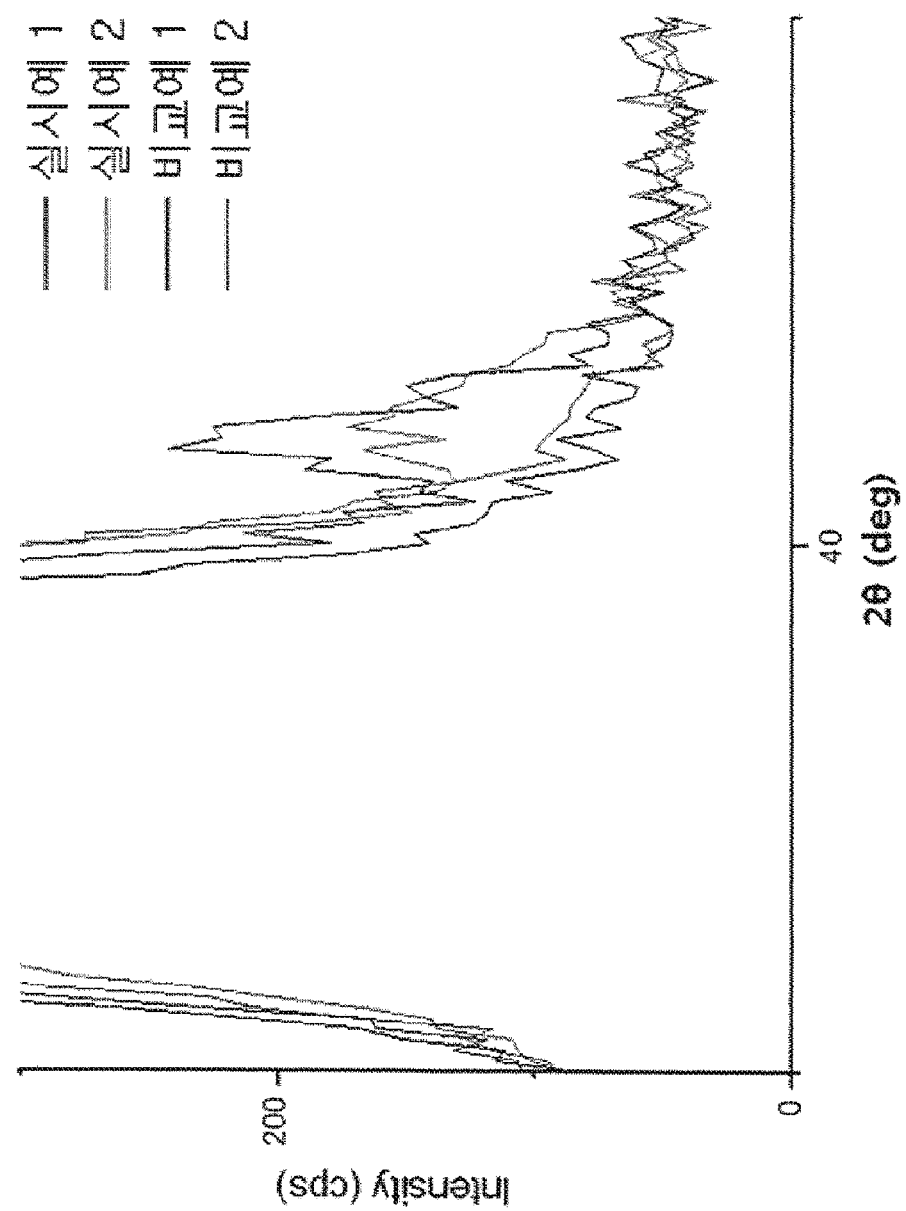

LITHIUM TRANSITION METAL PHOSPHATE, METHOD FOR PRODUCING SAME, AND LITHIUM SECONDARY BATTERY PRODUCED USING SAME

CROSS-REFERENCE TO RELATED APPLICATIONS

This application is a National Phase patent application and claims priority to and the benefit of International Application Number PCT/KR2014/007571, filed on Aug. 14, 2014, which claims priority to Korean Patent Application No. 10-2013-0167133, filed on Dec. 30, 2013, in the Korean Intellectual Property Office, the entire contents of all of which are incorporated herein by reference.

BACKGROUND

1. Field

One or more embodiments relate to a lithium transition metal phosphate including nano rod-like $Fe_2P$ crystals, a method of preparing the lithium transition metal phosphate, and a lithium secondary battery manufactured by using the lithium transition metal phosphate.

2. Description of the Related Art

Electronics, information, and communication industries have shown rapid development by manufacturing portable, small, light, and high-performance of electronic devices, and demands for a lithium secondary battery that may exhibit high capacity and high performance as a power source of electronic devices have increased. Furthermore, as electric vehicles (EVs) or hybrid electric vehicles (HEVs) have been put into practice, studies on lithium ion secondary batteries, which have high capacity and power and excellent stability, have been actively conducted.

As to cathode active materials for a lithium secondary battery, lithium-containing cobalt oxide ($LiCoO_2$) is usually used, and additionally, the use of lithium-containing manganese oxides such as $LiMnO_2$ with a lamellar crystal structure and $LiMn_2O_4$ with a spinel crystal structure and lithium-containing nickel oxides ($LiNiO_2$) has also been considered.

$LiCoO_2$ has various excellent physical properties such as cycle properties and thus is widely used, but is low in safety and high in cost due to resource limitations of cobalt as a raw material, and thus has limitation in large-scale use as a power source in the field such as electric vehicles. Since the crystal structure collapses during the charge-discharge, $LiNiO_2$ has problems in that the battery capacity is severely reduced and thermal stability is low, and lithium manganese oxides such as $LiMnO_2$ and $LiMn_2O_4$ are disadvantageous in poor cycle properties and the like.

Thus, lithium transition metal phosphate having an olivine structure, which is represented by lithium iron phosphate ($LiFePO_4$), has drawn attention as a material which is satisfactory in terms of resources, costs, and stability.

Since $LiFePO_4$ forms a tetrahedral structure while phosphor (P) and oxygen (O) in the crystal structure form a strong covalent bond, there is a great advantage in that $LiFePO_4$ is considerably stable in terms of thermal and chemical aspects. $LiFePO_4$ and $FePO_4$ from which lithium is deintercalated have fundamentally the same structure, and thus are advantageous in that the two materials are structurally very stable even though lithium ions are deintercalated, and a decrease in capacity scarcely occurs even after a few hundred cycles due to the stabilization of the structure.

Even though there is such an advantage, the commercialization of lithium iron phosphate with an olivine structure has not been easily obtained. The reason is because there are disadvantages such as low electronic conductivity, low ion conductivity and production of impurities caused by side reactions.

Among the disadvantages, the low electronic conductivity may be overcome by a method of performing coating with a carbonaceous material (Patent Document 1), and the low ion conductivity may be overcome by a method of shortening a lithium ion diffusion path by maintaining the particle size to be ultrafine (Patent Document 2).

However, since the composition of lithium iron phosphate sensitively varies according to the preparation method thereof, it is difficult to overcome a disadvantage of obtaining a product containing impurities which does not have a desired composition or oxidation number of transition metals. As a result, material and battery characteristics deteriorate, and accordingly, productivity, reliability and economic efficiency are reduced.

For example, Patent Document 3 describes, as a Comparative Example, an example in which iron phosphide ($Fe_2P$) as an impurity is produced due to the decomposition of $LiFePO_4$ by heat treatment at high temperature (1,000° C.), and clearly describes that Fe2P does not have a function as a cathode active material for a lithium ion secondary battery.

During the process of preparing lithium iron phosphate ($LiFePO_4$), impurities such as $Fe_2O_3$ and $Li_3Fe_2(PO_4)_3$ in addition to the aforementioned $Fe_2P$ may be additionally produced. Most of iron contained in the impurities is in the state where the oxidation number is +3, because iron electro-structurally tends to have an oxidation state of +3 rather than +2, and is easily oxidized in the process of calcination.

Thus, Patent Document 4 discloses an anion-deficient non-stoichiometric lithium transition metal polyacid compound, and describes that the production of iron with an oxidation state of +3 may be suppressed by controlling the ratio of phosphoric acid having an electric charge of −3 according to the method.

However, according to the present invention, it has been found that when the $Fe_2P$ crystal, which is publicly known as an impurity that reduces the performance of a battery in the related art, is included in the form of a nano rod in lithium transition metal phosphate, high rate capability and low-temperature properties of a lithium secondary battery including the crystal may be improved, thereby completing the present invention.

CITATION LIST

Patent Document (Patent Document 1) JP2003-292309 A
(Patent Document 2) JP2002-015735 A
(Patent Document 3) KR2012-0093874 A
(Patent Document 4) KR2010-0086413 A

SUMMARY

One or more embodiments include a lithium transition metal phosphate including nano rod-like $Fe_2P$ crystals.

One or more embodiments include a method of preparing lithium transition metal phosphate including nano rod-like $Fe_2P$ crystals reproducibly by adjusting exhaust conditions in a firing furnace.

One or more embodiments include a lithium secondary battery with improved high rate capability and low-temperature properties by using an anode material including the lithium transition metal phosphate.

Additional aspects will be set forth in part in the description which follows and, in part, will be apparent from the description, or may be learned by practice of the presented embodiments.

According to one or more embodiments, a lithium transition metal phosphate represented by the following Formula 1 includes nano rod-like $Fe_2P$ crystals.

$$LiFe_xM_{1-x}PO_4 \qquad \text{Formula 1}$$

(where $0<X\leq 1$, and M is one or more selected from Ni, Mn, Co, V, Cr, Cu, Ti, and Zr.)

Preferably, the nano rod-like $Fe_2P$ crystal may have a ratio of length to thickness from 1 time to 200 times, and more preferably, the nano rod-like $Fe_2P$ crystal may have a length from 1 μm to 10 μm and a thickness from 50 nm to 1 μm.

According to one or more embodiments, a method of preparing the lithium transition metal phosphate represented by Formula 1 includes a firing step of performing heat treatment in a firing furnace with a temperature-elevation interval, a retention interval and a cooling interval provided according to the transferring sequence of a fired raw material, each interval including one exhaust port or a plurality of exhaust ports, in which a whole or part of an airflow direction in the firing furnace is in a direction opposite to a transferring direction of the fired raw material by adjusting an exhaust amount of the plurality of exhaust ports.

According to one or more embodiments, a lithium transition metal phosphate includes nano rod-like $Fe_2P$ crystals may be provided, thereby enhancing high rate capability and low-temperature properties of a lithium secondary battery prepared using the same.

A whole or part of an airflow direction in a firing furnace may be controlled to be in a direction opposite to a proceeding direction of a fired raw material by adjusting the exhaust conditions in the firing process, thereby providing a method of preparing lithium transition metal phosphate such that the nano rod-like $Fe_2P$ crystals are reproducibly included.

BRIEF DESCRIPTION OF THE DRAWINGS

These and/or other aspects will become apparent and more readily appreciated from the following description of the embodiments, taken in conjunction with the accompanying drawings in which:

FIG. 1 is a schematic view illustrating a configuration of a general firing device for preparing a cathode active material for a lithium secondary battery;

FIG. 2 is an SEM photo illustrating lithium iron phosphate prepared according to Example 1;

FIG. 3 is an SEM photo illustrating the A portion of FIG. 2, which is magnified by 10 times;

FIG. 4 is an SEM photo illustrating the B portion of FIG. 2, which is magnified by 10 times;

FIG. 5 is an SEM photo illustrating lithium iron phosphate prepared according to Comparative Example 1;

FIG. 6 is an SEM photo illustrating FIG. 5, which is magnified by 10 times;

FIG. 7 is a graph comparing and illustrating the XRD patterns of lithium iron phosphate prepared according to Examples 1 and 2 and Comparative Examples 1 and 2;

FIG. 8 is a graph illustrating the magnified portion in the vicinity of a diffraction angle (2θ) of 47° of FIG. 7; and FIG. 9 is a graph illustrating the magnified portion in the vicinity of a diffraction angle (2θ) of 40° of FIG. 7.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present invention relates to lithium transition metal phosphate represented by the following Formula 1, which includes nano rod-like $Fe_2P$ crystals.

$$LiFe_xM_{1-x}PO_4 \qquad \text{Formula 1}$$

(where $0<X\leq 1$, and M is one or more selected from Ni, Mn, Co, V, Cr, Cu, Ti, and Zr.)

Specifically, referring to FIG. 2 which illustrates an SEM image of lithium iron phosphate ($LiFePO_4$) according to Example 1 of the present invention, it can be confirmed that nano rod-like $Fe_e$ P crystals are formed on the surface of the lithium iron phosphate particle, and referring to FIGS. 3 and 4 which illustrate a partially magnified view of FIG. 2, the nano rod-like shape can be more clearly confirmed.

Preferably, the nano rod-like $Fe_2P$ crystals may have a ratio of length to thickness from 1 time to 200 times. In particular, when the nano rod has a length from 1 μm to 50 μm and a thickness from 10 nm to 5 μm, it is possible to enhance high rate capability and low-temperature properties of a lithium secondary battery manufactured by using lithium transition metal phosphate formed by including the same, which is more preferred.

Referring to FIGS. 8 and 9 which illustrate the XRD pattern of the lithium iron phosphate prepared according to the Example of the present invention, it can be confirmed that diffraction peaks are shown at a diffraction angle (2θ) in a range from 40° to 40.5° and from 47° to 47.5°. The diffraction peak demonstrates the presence of $Fe_2P$ crystal, and no diffraction peak showing other impurities such as $Fe_2O_3$ and $Li_3Fe_2(PO_4)_3$ other than $Fe_2P$ and lithium iron phosphate was seen according to the XRD pattern.

The lithium transition metal phosphate preferably has a secondary particle form formed from the aggregation of primary particles represented by Formula 1. The specific surface area of the secondary particle is more preferably 20 $m^2/g$ to 80 $m^2/g$ in order to obtain a lithium secondary battery which is excellent in initial efficiency and high capability discharge performance.

Hereinafter, the preparation method of lithium transition metal phosphate according to the present invention will be described.

The present invention relates to a method of preparing lithium transition metal phosphate represented by the following Formula 1, the method including: a firing step of performing heat treatment in a firing furnace with a temperature-elevation interval, a retention interval and a cooling interval provided according to the transferring sequence of a fired raw material, each interval including one exhaust port or a plurality of exhaust ports, in which a whole or part of an airflow direction in the firing furnace is in a direction opposite to a transferring direction of the fired raw material by adjusting an exhaust amount of the plurality of exhaust ports.

  Formula 1

(where $0<X\leq1$, and M is one or more selected from Ni, Mn, Co, V, Cr, Cu, Ti, and Zr.)

First, an example of the configuration of a general firing device for preparing a cathode active material for a lithium secondary battery will be described as follows with reference to FIG. 1.

Referring to FIG. 1, the firing device is generally provided with a reaction vessel 20 which may be transferred by a roller, and is provided with a plurality of heaters (not illustrated) for heating a firing furnace 10 or a reaction gas supply line 30 for supplying a reaction gas or air. That is, a firing reaction occurs by charging a fired raw material into the reaction vessel 20, supplying the reaction gas, and heating the reaction vessel 20, and impurities are produced by thermal decomposition of a $CO_2$ gas and lithium transition metal phosphate during the firing reaction. In addition, the $CO_2$ gas or impurities produced as above hinder the facilitated synthetic reaction of the anode material, and thus need to be emitted, and a plurality of exhaust ports 41 is provided at the upper side of the firing furnace 10 for this purpose, and the $CO_2$ gas and the like to be emitted through the exhaust ports are emitted through an exhaust pipe 40. For better understanding, FIG. 1 illustrates only one reaction vessel 20, but substantially, a plurality of reaction vessels 20 may be continuously introduced into the firing furnace 10 so as to be subjected to a firing reaction while being transferred by a roller, and the plurality of reaction vessels 20 may be arranged in a plurality of rows and columns.

In the present invention, it has been found that when a whole or part of an airflow direction in the firing furnace, that is, a transferring direction of the $CO_2$ gas or impurities generated in the firing reaction process is controlled to be in a direction opposite to a direction of the fired raw material by adjusting an exhaust amount of the exhaust ports provided in the firing furnace, $Fe_2P$ particles in the impurities are grown into nano rod-like $Fe_2P$ crystals on the surface of the lithium transition metal phosphate. Furthermore, it has been found that when a lithium secondary battery is manufactured by including the lithium transition metal phosphate including nano rods in a cathode active material, high rate capability and low-temperature properties may be enhanced, thereby completing the present invention.

Specifically, the firing furnace may be classified into a temperature-elevation interval in which a predetermined temperature region is reached, a retention interval in which the elevated temperature is maintained, and a cooling interval in which the temperature gradually drops, according to the transferring sequence of the fired raw material.

In the present invention, when a whole or part of an airflow direction in the firing furnace may be in a direction opposite to a proceeding direction of the fired raw material, each exhaust amount of the plurality of exhaust ports in the firing furnace may be freely controlled.

Preferably, when the exhaust conditions of the temperature-elevation interval and the retention interval are controlled, nano rod-like $Fe_2P$ crystals are formed well.

Specifically, when the starting point of the temperature-elevation interval is set to I point and the final point of the retention interval (a point where the retention interval and the cooling interval meet) is set to II point (see FIG. 1), the exhaust amount of the exhaust port may be adjusted so as to satisfy one of the following Equations (1) to (6). However, this is several examples of the exhaust conditions, and the conditions are not limited thereto.

$$X>Y \tag{1}$$

$$Y>Z \tag{2}$$

$$X>Z \tag{3}$$

$$X\geq Y>Z \tag{4}$$

$$X>Y\geq Z \tag{5}$$

$$Y>X\geq Z \tag{6}$$

(here, X is an exhaust amount of an exhaust port disposed relatively close to I point, Z is an exhaust amount of an exhaust port disposed relatively close to II point, and Y is an exhaust amount of an exhaust port positioned between the X and Z measurement exhaust ports.)

In addition to the method of adjusting the exhaust amount of each exhaust port as described above, it is also possible to use a method to allow an airflow in the firing furnace to proceed in a direction of the temperature-elevation interval in the retention interval by adjusting a total exhaust amount of the temperature-elevation interval so as to be larger than a total exhaust amount of the retention interval.

The heat treatment temperature of the retention interval is preferably from 600° C. to 900° C. When the heat treatment temperature is less than 600° C., the crystallinity of primary particles may be insufficient and sintering between primary particles may not be completed, so that the specific surface is large, and the tap density is decreased. Enhancement in crystallinity is not sufficient and the material is not sufficiently stabilized, so that there is concern in that the battery performance such as charge/discharge capacity, service life and output may deteriorate. On the contrary, when the temperature exceeds 900° C., a disadvantage such as the phase decomposition is caused as a result of excessive sintering.

It is preferred that the heat treatment is performed under the reduction atmosphere using $H_2$, $N_2$ and a mixed gas thereof, and $H_2$ and $N_2$ may be introduced at a rate from 5 to 50 L/min and from 250 to 295 L/min, respectively.

Meanwhile, lithium transition metal phosphate may be a secondary particle formed from the aggregation of primary particles represented by $LiFe_xM_{1-x}PO_4$ (where $0<X\leq1$, and M is one or more selected from Ni, Mn, Co, V, Cr, Cu, Ti, and Zr), and as the preparing method thereof, it is possible to typically use publicly known methods such as a solid-state method, coprecipitation, a sol-gel method, and a spray pyrolysis method.

For example, when the spray pyrolysis method is exemplified, a method of preparing lithium transition metal phosphate secondary particles includes: preparing a slurry by wet-mixing a lithium supply source, a phosphoric acid supply source, and an iron supply source; and spraying and drying the slurry, in which powder obtained in the spraying and drying is introduced as a fired raw material into a firing furnace and subjected to heat treatment. A transition metal (M) supply source may be added in the preparing of the slurry and wet-mixed with the other supply sources, if necessary.

As the lithium supply source, hydroxides of lithium or salts of lithium are preferred, and examples of the hydroxides of lithium include lithium hydroxide (LiOH). In addition, examples of the salts of lithium include lithium inorganic acid salts such as lithium carbonate ($Li_2CO_3$) and lithium chloride (LiCl), lithium organic acid salts such as lithium acetate (LiCH$_3$COO) and lithium oxalate ((COOLi)$_2$), and hydrates thereof, and one or two or more kinds selected from the group thereof are suitably used.

As the phosphoric acid supply source, one or two or more kinds selected from the group consisting of phosphoric acid such as orthophosphoric acid (H$_3$PO$_4$) and methaphosphoric acid (HPO$_3$), ammonium dihydrogenphosphate (NH$_4$H$_2$PO$_4$), diammonium hydrogen phosphate ((NH$_4$)$_2$HPO$_4$), ammonium phosphate ((NH$_4$)$_3$PO$_4$) and hydrates thereof are suitably used. Among them, orthophosphoric acid, ammonium dihydrogenphosphate and diammonium hydrogen phosphate are suitable in that these compounds have a relatively high purity and compositions thereof are easily controlled.

As the iron supply source, one or two or more kinds selected from the group consisting of iron chloride (II) (FeCl$_2$), iron sulfate (II) (FeSO$_4$), iron acetate (II) (Fe(CH$_3$COO)$_2$), iron phosphate (Fe$_3$(PO$_4$)$_2$), and hydrates thereof are suitably used.

The supply source of the transition metal (M) is not particularly limited as long as the supply source is a compound capable of being ionized as salts including the metal element (M). The supply source is preferably an aqueous compound. Examples of the metal precursor include nitrates, sulfates, acetates, carbonates, oxalates, halides, oxides, hydroxide, alkoxides, mixtures thereof, and the like, which include M. In particular, nitrates, sulfates, or acetates are preferred.

A non-ionic surfactant may be added in the preparing of the slurry, materials publicly known in the art may be used as the surfactant without limitation, and for example, one or more selected from the group consisting of Triton X-100, acetic acid, cetyltrimethyl ammonium bromide (CTAB), isopropyltris (naminoethyl-aminoethyl) titanate, and 3-aminopropyltriethoxy-silane may be used. The surfactant is an additive which enhances the dispersibility of raw material compounds to aid in the formation of uniform particles.

In the preparing of the slurry, the slurry is obtained by mixing the lithium supply source, the phosphoric acid supply source, the iron supply source, and the transition metal supply source as the raw material compounds in a stoichiometric ratio in a solid state, if necessary, dispersing the solid mixture in a dispersion medium, and then wet-grinding the mixture using a medium stirring-type grinder, and the like.

As the dispersion medium which is used for the wet grinding of the slurry, various organic solvents and aqueous solvents may be used, but water is preferred. The total weight ratio of the raw material compound based on the entire slurry is preferably 20% by weight to 40% by weight. When the weight ratio is less than 20% by weight, the concentration of the slurry is extremely low, so that there is concern in that spherical particles produced by the spraying and drying may become smaller than necessary or easily broken, and the process rate may be slowed down. On the contrary, when the weight ratio exceeds 40% by weight, there is concern in that it may be difficult to maintain the uniformity of the slurry and a problem such as clogging of the process line may occur.

Next, in the spraying and drying, primary particles are formed by spraying and drying the slurry by a publicly known method, and furthermore, a lithium transition metal phosphate in the form of secondary particles is prepared from the aggregation of the primary particles.

As means for spraying, any publicly known spraying-drying device may be used, and the kind thereof is not limited. The sprayer is generally classified into a rotary disk type or a nozzle type, and the nozzle type is classified into a pressure nozzle and a two-fluid nozzle. In addition, all the means publicly known in the art, such as a rotary type sprayer, a pressure nozzle, an air type nozzle, and a sonic nozzle, may be used.

In the spraying and drying of the slurry, it is preferred to spray and dry the slurry at a hot wind temperature from 250° C. to 300° C. and at an exhaust hot wind temperature from 100° C. to 150° C. in order to enhance the shape, size and crystallinity of the particles.

Hereinafter, the present invention will be described in more detail with reference to Examples, but the present invention is not limited thereto.

EXAMPLE 1

Li$_2$CO$_3$ as a lithium supply source, Fe$_3$(PO$_4$)$_2$.8H$_2$O as an iron supply source, and (NH$_4$)$_2$HPO$_4$ as a phosphoric acid supply source were put into pure water as a solvent, mixed for 30 minutes by using a mixer, and then ground and mixed for 20 hours by using a beads mill (bead size=0.3 mm). Here, slurry was prepared by adding Triton X-100 as a non-ionic surfactant thereto, and performing milling for 20 hours. When Li$_2$CO$_3$, Fe$_3$(PO$_4$)$_2$.8H$_2$O, and (NH$_4$)$_2$HPO$_4$ were mixed, Li$_2$CO$_3$, Fe$_3$(PO$_4$)$_2$.8H$_2$O, and (NH$_4$)$_2$HPO$_4$ were mixed such that the molar ratio of [Li]:[Fe]:[P] is 1:1:1, and the Triton X-100 was mixed so as to be present in an amount of 7% by weight based on LiFePO$_4$ as a final product. In this case, the weight ratio of the solid content based on the solvent was 30%.

The slurry was sprayed and dried at a hot wind temperature of 285° C. and an exhaust hot wind temperature of 110° C. with a spraying and drying device (Dong Jin Spraying Drying Technology Co., Ltd., Sprayer Dryer (MD-005R)). The solvent was evaporated through the spraying and drying process, and a lithium iron phosphate (LiFePO$_4$) precursor was obtained in the form of secondary particles having an average particle diameter (D$_{50}$) of 10 um.

The precursor as a fired raw material was introduced into a firing furnace provided with a temperature-elevation interval/a retention interval/a cooling interval. The lithium iron phosphate (LiFePO$_4$) precursor was heated from normal temperature up to 735° C. at a temperature-elevation rate of 2° C./min (temperature-elevation interval), maintained in a state of 735° C. for 14 hours (retention interval), cooled down to 450° C. at a rate of 5° C./min (cooling interval), and then naturally cooled, thereby obtaining lithium iron phosphate including nano rod-like Fe$_2$P crystals.

When the temperature-elevation interval and the retention interval were classified into a total of 13 zones, the exhaust amount for each zone was adjusted as in the following Table 1. In this case, the firing was performed under the reduction atmosphere using H$_2$(4.7%)/N$_2$(95.3%) gas, and the amounts of gas introduced were the same as each other for each zone. H$_2$ and N$_2$ were introduced into the firing furnace at a rate of 14 L/min and 286 L/min, respectively.

EXAMPLE 2 AND COMPARATIVE EXAMPLES 1 AND 2

The lithium iron phosphate was prepared in the same manner as in Example 1, except that the exhaust conditions were adjusted as in the following Table 1.

TABLE 1

|  | 1 zone | 2 zone | 3 zone | 4 zone | 5 zone | 6 zone | 7 zone | 8 zone | 9 zone | 10 zone | 11 zone | 12 zone | 13 zone |
|---|---|---|---|---|---|---|---|---|---|---|---|---|---|
| Example 1 | 75 | 60 | 37.5 | 37.5 | 37.5 | 30 | 15 | 7.5 | 0 | 0 | 0 | 0 | 0 |
| Example 2 | 6 | 6 | 18 | 30 | 30 | 50 | 50 | 50 | 30 | 30 | 18 | 6 | 6 |
| Comparative Example 1 | 6 | 6 | 12 | 12 | 12 | 12 | 30 | 30 | 30 | 30 | 30 | 30 | 60 |
| Comparative Example 2 | 60 | 30 | 30 | 10 | 6 | 6 | 6 | 6 | 6 | 20 | 30 | 30 | 60 |

*In Table 1, the unit of the exhaust amount for each zone is L/min.

Analysis Example

The SEM observation results for the lithium iron phosphate prepared from the Examples and the Comparative Examples are shown in FIGS. 2 to 6, and the XRD diffraction patterns thereof are shown in FIGS. 7 to 9. The specification and analysis conditions of the XRD and SEM used are as follows.

SEM: taken by JSM-7400F from JEOL Ltd. (analysis condition: 10 kV)

XRD: analyzed by D/Max-2500VK/PC from Rikagu Inc. (Analysis condition: CuKa radiation, rate $2° \text{ min}^{-1}$)

Evaluative Example

A slurry was prepared by mixing the cathode active materials synthesized in the Examples and the Comparative Examples, Denka Black as a conductive material, and polyvinylidene fluoride (PVDF) as a binder at a weight ratio of 92:4:4. A cathode electrode plate was manufactured by uniformly coating the slurry on an aluminum (Al) foil.

A coin cell type lithium secondary battery was manufactured by using a lithium metal as a cathode, a separation membrane made of a porous PE material as a separation membrane, and a solution, in which 1.3 M $LiPF_6$ EC (ethylene carbonate):DMC (dimethyl carbonate):EC were mixed at a weight ratio of 5:3:2, as an electrolyte.

After the manufactured coin cell was left to stand at a constant temperature of 25° C. for 24 hours, a lithium secondary battery charge/discharge test device (Toyo, T475-HR) was used, the voltage region of a test cell was set to 3.0 to 4.5 to charge the battery in a CC (Constant Current)/CV (Constant Voltage) mode at a current of 0.2 C, and then discharge was conducted at a current of 1 C, 5 C, 10 C, 20 C, and 30 C and the discharge capacity at each current was measured.

Charge and discharge was conducted at a current of 0.1 C under the temperature condition of 25° C. and −20° C., and then each discharge capacity was measured, thereby obtaining a discharge capacity ratio at a low temperature with respect to normal temperature according to the following Equation (1).

Discharge capacity ratio (%)=(discharge capacity at −20° C./discharge capacity at 25° C.)*100     (1)

The discharge capacity ratio at a low temperature with respect to normal temperature and the charge and discharge rate, in the coin cells including lithium iron phosphate according to Examples 1 and 2 and Comparative Examples 1 and 2, which are measured according to the evaluation method, are shown in the following Table 2.

TABLE 2

|  | Discharge capacity ratio at low temperature with respect to normal temperature (−20° C./25° C.) | 1 C | 5 C | 10 C | 20 C | 30 C |
|---|---|---|---|---|---|---|
| Example 1 | 70.7% | 146.4 | 140.4 | 135.4 | 125.5 | 110.2 |
| Example 2 | 69.7% | 147.5 | 140.1 | 134.0 | 122.8 | 103.1 |
| Comparative Example 1 | 66.9% | 147.1 | 138.6 | 131.7 | 118.4 | 100.7 |
| Comparative Example 2 | 64.1% | 150.0 | 139.8 | 130.9 | 117.9 | 98.5 |

*In Table 1, the unit of the discharge capacity measured at 1 C, 5 C, 10 C, and 20 C is mAh/g.

Referring to Table 1, it can be seen that in the case of the coin cells manufactured by using lithium iron phosphate prepared according to Examples 1 and 2 of the present invention, the discharge capacity ratio at a low temperature to normal temperature and high rate capability were excellent compared to Comparative Examples 1 and 2.

Referring to FIGS. 2 to 4 illustrating SEM photos of lithium iron phosphate prepared according to Example 1, it could be confirmed that nano rod-like $Fe_2P$ crystals were formed on the surface of lithium iron phosphate, but referring to FIGS. 5 and 6 illustrating SEM photos of lithium iron phosphate prepared according to Comparative Example 1, nano rod-like $Fe_2P$ crystals were not confirmed.

Referring to FIGS. 7 and 8 comparing and illustrating the XRD diffraction patterns of $LiFePO_4$ prepared according to the Examples and the Comparative Examples, it can be seen that Examples 1 and 2 illustrate diffraction peaks at a diffraction angle (2θ) in a range from 40° to 40.5° and from 47° to 47.5°, and thus the nano rod like shape is the $Fe_2P$ crystal.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A lithium transition metal phosphate represented by the following Formula 1, which comprises nano rod-like $Fe_2P$ crystals, a nano rod-like Fe2P crystal of the crystals having a length in a range from 1 μm to 10 μm and a ratio of length to thickness in a range from 1 to 200:

$$LiFe_xM_{1-x}PO_4 \quad \text{Formula 1}$$

(where 0 <X ≤1, and M is one or more selected from Ni, Mn, Co, V, Cr, Cu, Ti, and Zr).

2. The lithium transition metal phosphate of claim 1, wherein the nano rod-like Fe$_2$P crystal has a thickness in a range from 50 nm to 1 µm.

3. The lithium transition metal phosphate of claim 1, wherein the lithium transition metal phosphate has diffraction peaks at a diffraction angle (2θ) in ranges from 40° to 40.5° and from 47° to 47.5°, respectively, in the X-ray diffraction (XRD) measurement.

4. The lithium transition metal phosphate of claim 1, wherein the lithium transition metal phosphate is in the form of secondary particles that are formed by aggregation of primary particles.

5. The lithium transition metal phosphate of claim 4, wherein the secondary particles have a specific surface area in a range from 20 m$^2$/g to 80 m$^2$/g.

6. A method of preparing a lithium transition metal phosphate represented by the following Formula 1, the method comprising a firing process performed by heat-treating while transferring a raw material in a firing furnace, in which a temperature-elevation interval, a retention interval, and a cooling interval are sequentially provided, wherein each interval comprises one exhaust port or a plurality of exhaust ports, wherein the whole or a part of an airflow direction in the firing furnace is in a direction opposite to a transferring direction of the fired raw material by adjusting an exhaust amount of the plurality of exhaust ports:

LiFe$_x$M$_{1-x}$PO$_4$    Formula 1

(where 0 <X ≤1, and M is one or more selected from Ni, Mn, Co, V, Cr, Cu, Ti, and Zr).

7. The method of claim 6, wherein the lithium transition metal phosphate comprises Fe$_2$P crystals having diffraction peaks at a diffraction angle (2θ) in ranges from 40° to 40.5° and from 47° to 47.5°, respectively, in the X-ray diffraction (XRD) measurement.

8. The method of claim 6, wherein when a starting point of the temperature-elevation interval is set to I point, and a final point of the retention interval (a point where the retention interval and the cooling interval meet) is set to II point, each exhaust amount of the plurality of the exhaust ports is adjusted so as to satisfy one of the following Equations (1) to (6):

$$X > Y \quad (1)$$

$$Y > Z \quad (2)$$

$$X > Z \quad (3)$$

$$X \geq Y > Z \quad (4)$$

$$X > Y \geq Z \quad (5)$$

$$Y > X \geq Z \quad (6)$$

(where X is an exhaust amount of an exhaust port disposed relatively close to I point, Z is an exhaust amount of an exhaust port disposed relatively close to II point, and Y is an exhaust amount of an exhaust port positioned between the X and Z measurement exhaust ports).

9. The method of claim 6, wherein airflow in the firing furnace is allowed to proceed in a direction of the temperature-elevation interval in the retention interval by adjusting the total exhaust amount of the temperature-elevation interval to be larger than the total exhaust amount of the retention interval.

10. The method of claim 6, wherein a heat-treatment temperature in the retention interval is in a range from 600° C. to 900° C.

11. The method of claim 6, wherein the heat-treatment is performed under a reduction atmosphere using H$_2$, N$_2$, and a mixed gas thereof, wherein H$_2$ and N$_2$ are introduced at a rate in a range from 5 to 50 L/min and at a rate in a range from 250 to 295 L/min, respectively.

* * * * *